(12) United States Patent
Elser et al.

(10) Patent No.: US 9,418,337 B1
(45) Date of Patent: Aug. 16, 2016

(54) SYSTEMS AND MODELS FOR DATA ANALYTICS

(71) Applicant: Palantir Technologies, Inc., Palo Alto, CA (US)

(72) Inventors: Jeremy Elser, New York, NY (US); Sebastian Caliri, San Francisco, CA (US); Katherine Sebastian, New York, NY (US); Dustin Janatpour, San Mateo, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 14/805,313

(22) Filed: Jul. 21, 2015

(51) Int. Cl.
*G06N 5/04* (2006.01)
*G06F 17/30* (2006.01)
*G06N 7/00* (2006.01)

(52) U.S. Cl.
CPC .............. *G06N 5/04* (2013.01); *G06F 17/3053* (2013.01); *G06F 17/30542* (2013.01); *G06N 7/00* (2013.01)

(58) Field of Classification Search
None
See application file for complete search history.

(56) References Cited

U.S. PATENT DOCUMENTS

| | | | |
|---|---|---|---|
| 5,893,072 A * | 4/1999 | Zizzamia | G06Q 40/08 705/4 |
| 6,505,196 B2 | 1/2003 | Drucker et al. | |
| 6,523,019 B1 | 2/2003 | Borthwick | |
| 7,383,239 B2 * | 6/2008 | Bonissone | G06Q 40/00 706/20 |
| 7,418,431 B1 | 8/2008 | Nies et al. | |
| 7,813,937 B1 | 10/2010 | Pathria et al. | |
| 7,827,045 B2 | 11/2010 | Madill et al. | |
| 8,214,232 B2 | 7/2012 | Tyler et al. | |
| 8,301,464 B1 | 10/2012 | Cave et al. | |
| 8,578,500 B2 | 11/2013 | Long | |
| 8,639,522 B2 | 1/2014 | Pathria et al. | |
| 8,655,687 B2 * | 2/2014 | Zizzamia | G06Q 10/0635 705/4 |
| 2003/0163352 A1 | 8/2003 | Surpin et al. | |
| 2005/0108063 A1 | 5/2005 | Madill et al. | |
| 2005/0149527 A1 * | 7/2005 | Berlin | G06Q 90/00 |
| 2006/0149596 A1 | 7/2006 | Surpin et al. | |
| 2006/0241974 A1 | 10/2006 | Chao et al. | |
| 2007/0192143 A1 | 8/2007 | Krishnan et al. | |
| 2007/0299697 A1 | 12/2007 | Friedlander et al. | |
| 2008/0195417 A1 | 8/2008 | Surpin et al. | |

(Continued)

FOREIGN PATENT DOCUMENTS

| | | |
|---|---|---|
| DE | 102014103476 | 9/2014 |
| GB | 2514239 | 11/2014 |

OTHER PUBLICATIONS

Definition "Identify" downloaded Jan. 22, 2015, 1 page.

(Continued)

*Primary Examiner* — Kakali Chaki
*Assistant Examiner* — Eric Nilsson
(74) *Attorney, Agent, or Firm* — Knobbe, Martens, Olson & Bear, LLP

(57) ABSTRACT

Systems and methods are provided that allow for generating and applying an improved predictive data model that aggregates two or more models performed sequentially, for the purposes of improving the prediction of overall profitability of individuals or households in a population. The models may be generated by the processing of customer profitability data and third-party population data together. One of the two aggregated models may be an inherently probabilistic, binary model tasked with determining whether an individual is a high-loss individual and using that result to improve the predictive capability of the system.

20 Claims, 13 Drawing Sheets

(56) References Cited

U.S. PATENT DOCUMENTS

| | | |
|---|---|---|
| 2011/0246229 A1 | 10/2011 | Pacha |
| 2013/0006668 A1 | 1/2013 | Van Arkel et al. |
| 2014/0052466 A1 | 2/2014 | DeVille et al. |
| 2014/0058754 A1 | 2/2014 | Wild |
| 2014/0136237 A1 | 5/2014 | Anderson et al. |
| 2015/0186821 A1 | 7/2015 | Wang et al. |
| 2015/0187036 A1 | 7/2015 | Wang et al. |

OTHER PUBLICATIONS

Definition "Overlay" downloaded Jan. 22, 2015, 1 page.
Official Communication for U.S. Appl. No. 14/289,596 dated Jul. 18, 2014.
Official Communication for U.S. Appl. No. 14/289,599 dated Jul. 22, 2014.
Official Communication for U.S. Appl. No. 14/170,562 dated Sep. 25, 2014.
Official Communication for U.S. Appl. No. 14/289,596 dated Jan. 26, 2015.
Official Communication for U.S. Appl. No. 14/449,083 dated Oct. 2, 2014.
Official Communication for U.S. Appl. No. 14/449,083 dated Mar. 12, 2015.
Official Communication for U.S. Appl. No. 13/949,043 dated May 7, 2015.
Official Communication for U.S. Appl. No. 14/518,757 dated Apr. 2, 2015.
Official Communication for U.S. Appl. No. 14/289,599 dated May 29, 2015.
Official Communication for U.S. Appl. No. 14/289,596 dated Apr. 30, 2015.
Official Communication for U.S. Appl. No. 14/518,757 dated Jul. 20, 2015.
Official Communication for U.S. Appl. No. 14/170,562 dated Jul. 17, 2015.
Official Communication for Great Britain Patent Application No. 1404573.6 dated Sep. 10, 2014.

* cited by examiner

Member Age by Profitability Grouping

| Profitability | 0-9 | 10-19 | 20-29 | 30-39 | 40-49 | 50-59 | 60-69 |
|---|---|---|---|---|---|---|---|
| High-loss | 8% | 8% | 12% | 14% | 16% | 24% | 18% |
| Small-loss | 32% | 30% | 15% | 11% | 8% | 3% | 1% |
| Profitable | 2% | 1% | 12% | 13% | 19% | 29% | 24% |
| Avg Member Profit ($) | -161 | -176 | -158 | -104 | -37 | 51 | 211 |

1. Decision Tree Identified 13 Intuitive Segments (501)

```
Max Age in HouseHold <= 0.404 :
|   Num in Household <= 0.019 :
|   |   Max Age in HouseHold <= 0.154 : LM1
|   |   Max Age in HouseHold > 0.154 :
|   |   |   CAPE: Median Age <= 0.513 : LM2
|   |   |   CAPE: Median Age > 0.513 :
|   |   |   |   CAPE: Median HH Income <= 0.341 : LM3
|   |   |   |   CAPE: Median HH Income > 0.341 : LM4
|   Num in Household > 0.019 : LM5
Max Age in HouseHold > 0.404 :
|   Num in Household <= 0.019 :
|   |   Max Age in HouseHold <= 0.551 : LM6
|   |   Max Age in HouseHold > 0.551 :
|   |   |   Census: County Size <= 0.25 : LM7
|   |   |   Census: County Size > 0.25 : LM8
|   Num in Household > 0.019 :
|   |   Max Age in HouseHold <= 0.522 : LM9
|   |   Max Age in HouseHold > 0.522 :
|   |   |   CAPE: Percent Black Only <= 0.029 : LM10
|   |   |   CAPE: Percent Black Only > 0.029 :
|   |   |   |   Avg Gender <= 0.775 : LM11
|   |   |   |   Avg Gender > 0.775 :
|   |   |   |   |   CAPE: Median Home Value <= 0.194 : LM12
|   |   |   |   |   CAPE: Median Home Value > 0.194 : LM13
```

2. For members described by LM7 (Older, Rural) (503)

LM7 Profitability Decile (*Lower is More Profitable*) =
+0.4192 * Census: County Size
+0.3811 * Max Age in HouseHold
+0.2252 * CAPE: Percent Asian Only
−0.0964 * CAPE: % Marr Couple Fam W/O Kids
+0.0780 * CAPE: Percent Owner Occupied
−0.0026 * Num in Household
+0.0025 * CAPE: Percent Hispanic
+0.0019 * CAPE: Median Household Income
+0.0012 * CAPE: Percent Spanish Speaking
−0.0011 * Max Length of Residence
+0.0011 * Avg Number of Children in Living Unit
+0.0965

3. Example application: (505)

Rural family with head of household aged 36 likely in 2nd decile.
Same family with head of household age 60 likely in 4th decile.

SYSTEMS AND MODELS FOR DATA ANALYTICS

TECHNICAL FIELD

The present disclosure relates to systems and techniques for data integration, analysis, and visualization. More specifically, embodiments of the present disclosure relate to aggregating two or more predictive data models performed sequentially for improved precision in predicting profitability of individual or household-level health insurance customers, and then providing that analytics information in an interactive user interface and a format specifically tailored to suit an end-user's needs.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Companies typically perform customer analytics in order to improve the overall profitability of their business by obtaining a better understanding of their customers. In some industries, such as the health insurance industry, customers may generate a profit for the company, or they might cost the company a small or large amount of money depending on the insurance benefits the customer receives. In this scenario, the company might seek to minimize the number of customers that will end up costing a company a large amount of money.

SUMMARY OF THE DISCLOSURE

This disclosure inventively recognizes it is an important challenge for a company or organization to utilize the vast amounts of data available in order to predict, with great precision, the characteristics or behavior associated with an individual—such as their potential profitability or cost to the company.

The systems, methods, and devices described herein each have several aspects, no single one of which is solely responsible for its desirable attributes. Without limiting the scope of this disclosure, several non-limiting features will now be discussed briefly.

Improved systems and data models are disclosed herein that allow users to perform sequential regression models for improved predictability. The system described herein may be applied to any large dataset and not just in the context of the healthy insurance industry for the purposes of predicting overall profitability. The system can be applied to any industry or function in order to make improved predictions on a dependent variable.

In some embodiments, the system may be used to assist healthcare or health insurance providers in assessing the overall profitability of customers or potential customers. It may be used to identify individuals for managed care. It may also be used to identify individuals or households that are prone to disaster. The system may then output results that can be easily interpreted or visualized, and these results may be used to guide business decisions or strategy. As an example, the system may predict the overall profitability of all the individuals in a state, and then order the results from most-to-least profitable in order to guide customer acquisition efforts. The system may overlay the profitability of individuals or households over a map so that the profitability of different neighborhoods can be compared.

In some embodiments, the system may comprise a data model that can be applied to new cohorts or groups of individuals, whose data was not used in generating the data model itself. The data model may be powered by a machine learning algorithm or engine. The data model may actually be an aggregated data model that uses two or more separate models performed sequentially.

According to some embodiments, the system is a computing system for filtering and ordering a raw dataset comprising a large plurality of data for a population received by a computer network, the computing system comprising: a network interface that is coupled to a data network for receiving and transmitting one or more packet flows, the packet flows comprising: a first dataset containing a large plurality of data associated with individuals in a population, and a second dataset containing at least the values associated with the known profitability of individuals in a subset of the population. The computing system further comprising: a persistent memory configured to store datasets, including the first dataset and the second dataset; a computer processor; and a computer readable storage medium storing program instructions configured for execution by the computer processor in order to cause the computing system to: access the first dataset and the second dataset; identify the overlapping individuals present in both the first dataset and second dataset; combine the data from the first dataset and the second dataset corresponding to the overlapping individuals into a matched dataset; resample the matched dataset to randomly produce a test set and a proof set, wherein the test set and the proof set are both non-overlapping subsets of the matched dataset; generate an aggregate data model comprising a first model and a second model; validate the aggregate data model by comparing a known profitability of individuals in the proof set against a predicted profitability of individuals in the proof set, wherein the predicted profitability of individuals in the proof set is calculated by the aggregate data model; access a pipeline dataset containing a large plurality of data associated with a group of individuals; apply the profitability model in the aggregate data model to calculate the overall profitability of each individual from the group of individuals in the pipeline dataset; apply the second model to calculate the likelihood of disaster associated with each individual in the group of individuals from the pipeline dataset; filter out some of the individuals from the group of individuals in the pipeline dataset, according to the calculated likelihood of disaster associated with each individual; order the remaining individuals from the group of individuals in the pipeline dataset by their predicted profitability calculated from the first model; and present an ordered list of the remaining individuals ranked by their predicted profitability.

According to some embodiments, the large plurality of data in the first dataset comprises demographic data, geographical data, and/or behavioral data associated with individuals in a population. According to some embodiments, generating an aggregate data model comprising a first model and a second model involves a decision tree algorithm to perform a segmented linear regression on the test set. According to some embodiments, the first model is a profitability model and the second model is a high-loss binary model. According to some embodiments, the profitability model is configured to calculate the predicted profitability of an individual using data fields found in the test set for at least one independent variable. According to some embodiments, the profitability model is configured to calculate the predicted profitability of a household using data fields found in the test set for at least one independent variable. According to some embodiments, the high-loss binary model is configured to calculate the likelihood of disaster of an individual using data fields found in the test set for at least one independent variable, and is further configured to classify the individual as a disaster or a non-disaster based on the individual's calculated likelihood of disaster. According to some embodiments, the large plurality of data in the pipeline dataset comprises demographic data, geographical data, or behavioral data associated with a group of individuals. According to some embodiments, the matched dataset contains data associated with fewer individuals than the total individuals in the first dataset. According to some embodiments, identifying the overlapping individuals present in both the first dataset and the second dataset involves using a fuzzy-match on overlapping data fields between the first dataset and the second dataset. According to some embodiments, the overlapping data fields in the second dataset and the first dataset used in the fuzzy-match comprise at least one of: a name associated with an individual, an address associated with an individual, a postal code associated with an individual, and a phone number associated with an individual. According to some embodiments, the program instructions further cause the system to normalize values of the demographic data, geographical data, or behavioral data in the first dataset to be within zero and one prior to performing a fuzzy match between the second dataset and the first dataset. According to some embodiments, resampling the matched dataset to randomly produce a test set and a proof set results in a test set that is a subset of the matched dataset containing greater than approximately half of the data contained in the matched dataset, and a proof set that is a subset of the matched dataset containing less than approximately half of the data contained in the matched dataset. According to some embodiments, the program instructions further cause the computing system to visually present the profitability of at least one individual, household, and/or neighborhood on a map or user interface based on a corresponding address or location of the at least one individual, household, and/or neighborhood. According to some embodiments, the second model is a high-loss binary model that further applies a classification to each individual in the group of individuals from the pipeline dataset based on the calculated likelihood of disaster. According to some embodiments, filtering out some of the individuals from the group of individuals in the pipeline dataset according to the calculated likelihood of disaster associated with each individual further involves classifying each individual as a disaster or a non-disaster. According to some embodiments, the high-loss binary model is further configured to calculate the average likelihood of disaster in a group of individuals and compare it to an individual's calculated likelihood of disaster, in order to classify an individual as a disaster or a non-disaster based on the individual's calculated likelihood of disaster.

According to some embodiments, the system is a computing system configured to process data, generate a data model, and apply a data model, the computing system comprising: a network interface that is coupled to a data network for receiving and transmitting one or more packet flows; a persistent memory; a computer processor; and a computer readable storage medium storing program instructions configured for execution by the computer processor. The program instructions are configured for execution by the computer processor in order to cause the computing system to: access a first dataset containing demographic data associated with individuals in a population; access a second dataset containing values associated a known profitability of individuals in a subset of the population; identify the overlapping individuals present in both the first dataset and second dataset; combine the data from the first dataset and the second dataset that corresponds to the overlapping individuals into a matched dataset; resample the matched dataset to randomly produce a test set and a proof set; generate an aggregate data model on the test set, wherein the aggregate data model is comprised of a first model and a second model; validate the aggregate data model by comparing the known profitability of individuals in the proof set against the predicted profitability of individuals in the proof set, wherein the predicted profitability of individuals in the proof set is calculated by the aggregate data model; access a pipeline dataset containing demographic data associated with a group of individuals; apply the profitability model in the aggregate data model to calculate the overall profitability of each individual from the group of individuals in the pipeline dataset; apply the second model to calculate the likelihood of disaster associated with each individual in the group of individuals from the pipeline dataset; classify each individual in the group of individuals from the pipeline dataset as a disaster or a non-disaster; filter out some of the individuals classified by the second model as a disaster from the group of individuals in the pipeline dataset; order the remaining individuals from the group of individuals in the pipeline dataset by their predicted profitability calculated from the first model; and present an ordered list of the remaining individuals ranked by their predicted profitability.

According to some embodiments, the first dataset further comprises demographic data, geographical data, and/or behavioral data associated with individuals in a population. According to some embodiments, identifying the overlapping individuals present in both the first dataset and the second dataset involves using a fuzzy-match on overlapping data fields between the first dataset and the second dataset, wherein the overlapping data fields in the second dataset and the first dataset used in the fuzzy-match comprise at least one of: a name associated with an individual, an address associated with an individual, a postal code associated with an individual, and a phone number associated with an individual. According to some embodiments, the first model is a profitability model and the second model is a high-loss binary model. According to some embodiments, generating an aggregate data model involves using a decision tree algorithm to perform a segmented regression on the test set. According to some embodiments, the program instructions further cause the computing system to generate an easily-interpretable evaluation tool, wherein the easily-interpretable evaluation tool comprises a plot with a Y-axis representing predicted average profit of targeted households and a X-axis representing percentage of low-profit households excluded.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 1 illustrates a table with insurance membership age distributions for various profitability groupings.

FIG. 5 further illustrates a diagram showing how the improved data model can predict profitability of any individual in a population.

Figure 2:
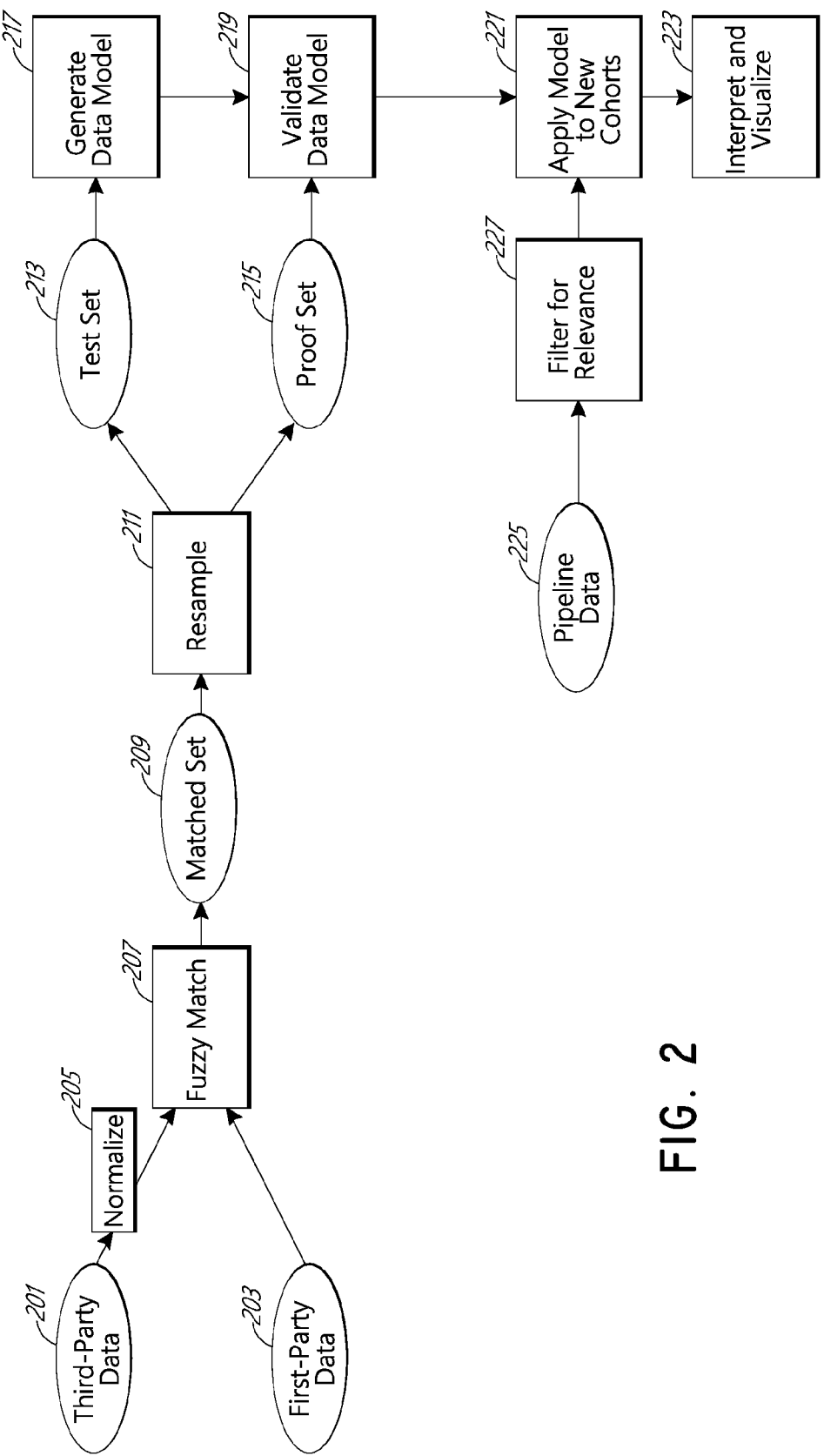
FIG. 2 illustrates a block diagram for a system that produces improved prediction of overall profitability according to one embodiment.

Throughout the drawings, reference numbers may be reused to indicate correspondence between referenced elements. Nevertheless, use of different numbers does not necessarily indicate a lack of correspondence between elements. And, conversely, reuse of a number does not necessarily indicate that the elements are the same.

DETAILED DESCRIPTION OF SPECIFIC EMBODIMENTS

Definitions

In order to facilitate an understanding of the systems and methods discussed herein, a number of terms are defined below. The terms defined below, as well as other terms used herein, should be construed broadly to include, without limitation, the provided definitions, the ordinary and customary meanings of the terms, and/or any other implied meanings for the respective terms. Thus, the definitions below do not limit the meaning of these terms, but only provide example definitions.

Database: A broad term for any data structure for storing and/or organizing data, including, but not limited to, relational databases (for example, Oracle database, mySQL database, and the like), spreadsheets, XML files, and text file, among others. The various terms "database," "data store," and "data source" may be used interchangeably in the present disclosure. A database may be stored in a tangible, fixed medium such as a hard drive, flash drive, optical disc, among others. Or a database may be stored in an intangible medium such as on a cloud computing platform as a cloud database. A database may have data stored in various locations.

Data Item (Item), Data Object (Object), or Data Entity (Entity): A data container for information representing a specific thing, or a group of things, in the world. A data item may be associated with a number of definable properties (as described below). For example, a data item may represent an item such as a person, a place, an organization, an account, a computer, an activity, a market instrument, or other noun. A data item may represent an event that happens at a point in time or for a duration. A data item may represent a document or other unstructured data source such as an e-mail message, a news report, or a written paper or article. Each data item may be associated with a unique identifier that uniquely identifies the data item. The terms "data item," "data object," "data entity," "item," "object," and "entity" may be used interchangeably and/or synonymously in the present disclosure.

Properties: Also referred to herein as "attributes" or "metadata" of data items. A property of a data item may include any item of information associated with, and/or relevant to, the data item. At a minimum, each property of a data item has a property type and a value or values. For example, properties associated with a person data item may include a name (for example, John Doe), an address (for example, 123 S. Orange Street), and/or a phone number (for example, 800-0000), among other properties. In another example, properties associated with a computer data item may include a list of users (for example, user1, user 2, and the like), and/or an IP (internet protocol) address, among other properties.

Property Type: The type of data a property is, such as a string, an integer, or a double. Property types may include complex property types, such as a series data values associated with timed ticks (for example, a time series), and the like.

Property Value: The value associated with a property, which is of the type indicated in the property type associated with the property. A property may have multiple values.

Regression: Also referred to as a "regression analysis." A regression may refer to a statistical process for estimating the relationships among variables. It may refer to various techniques for modeling and analyzing several variables in order to determine the relationship between a dependent variable and one or more independent variables. It may help show how the value of a dependent variable changes as independent variable changes. It may be used to calculate the value of the dependent variable given known values for the independent variables. It may be used to calculate the conditional expectation of the dependent variable given the independent variables. A regression may be used to help understand or infer causal and/or correlative relationships between the dependent and independent variables.

Regression Function: A regression function may be the estimation target that is a function of the independent variables that is used in a regression. The regression function may be a result of various techniques. The regression function may be a result of a parametric regression, so that the regression function is defined in terms of a finite number of unknown parameters that are estimated from the data. This may include linear regression and ordinary least squares regression methods. The regression function may be a result of a nonparametric regression, such that the regression function may lie in a specified set of functions, which may be infinite-dimensional.

Data Model (Model): A data model may be a method of organizing data elements and standardizing how those data elements relate to each other. A data model may include a regression model or a method of performing a regression analysis. The data model may include the form or technique for a data gathering or generating process. The data model may include ways to interpolate or extrapolate values of variables. The data model may include methods of interpreting data or values generated by the model. The data model may organize the data and present it to a user relying on the model in a way that makes it easier for the user to interpret. The data model may consist of multiple components, or multiple models, which may or may not be modular in nature.

Machine Learning Algorithm: A machine learning algorithm is an algorithm that can make predictions on data. The machine learning algorithm may build a data model from examples inputs in order to make data-driven predictions or decisions. The machine learning algorithm may be used to perform predictive analytics or predictive modeling. A machine learning algorithm may be used by a computer in scenarios where it is infeasible to provide an explicit set of instructions or algorithm.

Non-Clinical Data or Non-Clinical Features: Non-clinical data refers to data that excludes clinical data. Clinical data refers to health or medical information that can only be collected during the course of ongoing patient care or as part of a formal clinical trial program. Clinical data may include data exclusive to electronic health records, administrative data, claims data, disease registries, healthy surveys, and clinical trials data, as some non-limiting examples. Non-clinical data does not contain this health related information for individuals, and may comprise data related to the demographics, geography, behavior, and various other characteristics of, individuals.

Member or Customer: Member and customer are used interchangeably herein. A member may be an entity that purchases goods or services from a company. A member may be someone who enters into a contract with an insurance company to pay insurance premiums over time, but receive certain insurance benefits depending on medical needs that may arise. A member or customer may refer to an individual, but it may also refer to the individuals in a household.

Cohort: A cohort is a group of individuals. A cohort may be a group of individuals within a population. The grouping of the individuals may be tightly defined. For example, a cohort may be three specific individuals named "Sally", "Mike", and "Steve." The grouping of individuals may be broadly defined. For example, a cohort may be all the individuals in a given state who are not currently existing customers. Thus, the grouping may be done based on various characteristics such as population, geography, status, and time, among other things.

Population: A population is a large group of individuals. This grouping of individuals may be based on a particular geographical area. For example, a population may consist of all the individuals in a given state. It may be even broader than that, such as the population of all the individuals in a country. It may be narrower than that, such as the population in a region, neighborhood, town, city, etc. There may be overlap in how a cohort or population may be defined, but generally a cohort is a smaller grouping or subset within a given population. For example, population may refer to all the individuals in a state, and a possible cohort may be all the individuals age 18-22 within that state.

Inventive Realizations

One way of performing customer analytics is through a linear regression analysis, which involves choosing various descriptor variables in order to produce a regression function used to predict a chosen outcome, such as the overall profitability of a customer. The corresponding data for the descriptor variables used to fit the regression function can be obtained from first-party or third-party datasets on the customers.

For example, a health insurance provider might choose to perform customer analytics in order to better predict the medical insurance profitability for a customer. One way to do this would be to choose customer characteristics—such as age, income, and location of the customer—with easily-obtainable datasets and have some degree of predictive capability towards the profitability of a customer. Then, a regression function can be curve-fit to the available data in order to predict how profitable an individual might be over time.

However, this approach of utilizing a single, simplistic model is poor at predicting medical insurance profitability. One problem is that a simple regression is unable to separate the highly-profitable individuals from the individuals who are disaster-prone and will cost the company a great amount, because both groups of individuals may have similar characteristics such as age distributions. For example, individuals between the ages of 40-70 may comprise both the bulk of the profitable customers and the bulk of the high-loss customers. Under a simplistic model, it will be difficult for an insurance company to discern between the profitable and high-loss individuals. It results in the company having to bear a great deal of risk in order to generate profits.

Thus, the present disclosure relates to advanced systems and methods, certain embodiments of which include the inventive realization that separating these high-loss individuals from the profitable individuals using non-clinical features and data can lead to better predictions of an individual's profitability as a medical insurance customer that can be leveraged to make effective business decisions. However, such a method would not need to be strictly applied to the medical insurance industry. It could also be used in any capacity where a simple regression model is insufficient or not reliable for providing precise predictions of an independent variable.

Certain embodiments also include the inventive realization that separating the high-loss individuals from the profitable individuals can be done by using an aggregated data model that utilizes two or more regression models. One of the models may calculate the profitability of an individual. The other model may be tasked with identifying the high-loss individuals or to identify individuals for managed care. Once identified, these individuals may be excluded, suppressed, or mitigated from a list or population of individuals.

Certain embodiments also include the inventive realization that identifying the high-loss individuals can be done using an inherently probabilistic, binary model. In some cases, this involves calculating a likelihood of disaster for an individual. That result may be then converted into a binary outcome of the individual flagged as either a disaster (i.e., a high-loss individual) or a non-disaster. Classifying the individuals as either a high-loss individual or not may be done by comparing the individual's likelihood of disaster to a baseline or threshold value. For example, an individual's likelihood of disaster may be compared to the average likelihood of disaster in a cohort or population. Individuals with a higher likelihood of disaster may then be classified as high-loss individuals.

Certain embodiments also include the inventive realization that identifying the high-loss individuals can be done using any kind of model, and not necessarily an inherently probabilistic, binary model. In some embodiments, identifying the high-loss individuals can be done using a trinary model such that individuals are classified into three groups: high-loss, medium-loss, or low-loss individuals. In some embodiments, the model used to identify the high-loss individuals classifies individuals into three, or more three, groups. In some embodiments, the model used to identify the high-loss individuals may be a profitability model or a decile model. The profitability model and the previously-mentioned disaster binary model represent extreme cases on the spectrum of available models that can be used to identify the high-loss individuals. The profitability model is the most granular and least accurate. It has high precision, but low statistical power. The disaster binary model is the least granular and most accurate. Any middle-ground option could instead be used as the model in identifying the high-loss individuals. For example, either a trinary or decile model would be more granular than a binary model, at the expense of accuracy. The example models provided in this paragraph (profitability, binary, trinary, decile) represent only some of the models that can be used in identifying the high-loss individuals and are not intended to be limiting.

Certain embodiments also include the inventive realization that results from the data model can be processed to be presented in a way that makes it easier for an end user to analyze and make effective business decisions. Some embodiments will order the individuals in a cohort by each individual's predicted profitability, such that it is easily ascertainable which individuals are the most profitable in a cohort.

Thus, various embodiments of the present disclosure provide improvements to various technological fields. For example, as described above, existing systems for predictive modeling (including those used in the health insurance or health care fields for the purposes of predicting a customer's profitability) are limited in various ways (they lack precision and reliability in separating out closely-related types of individuals), and various embodiments of the disclosure provide significant improvements over such technology. However, such improvements can be applied to various technological fields. For example, given enough data about the long-term performance of used cars, a predictive data model could be applied to used cars to help separate out the "lemons", or disaster-prone cars, from the cars that provide good value over their remaining lifespan. Additionally, various embodiments of the present disclosure are inextricably tied to computer technology. In particular, various embodiments rely on presentation of results via an interactive graphical user interface. Such features are intimately tied to, and enabled by, computer technology, and would not exist except for computer technology. For example, the interactions with the data described below in reference to various embodiments cannot reasonably be performed by humans alone, without the computer technology upon which they are implemented. Further, the implementation of the various embodiments of the present disclosure via computer technology enables many of the advantages described herein, including improved precision of predictions and more efficient processing, interaction, and presentation of various types of data.

Overview

FIG. 1 illustrates an obstacle for health insurance companies seeking to perform customer analytics on profitability by presenting a table with member age distributions for various profitability groupings.

The profitability groupings are high-loss grouping 101, small-loss grouping 103, and profitable grouping 105. These profitability groupings are reflective of the member base for health insurance companies and reflect the monetary outcomes for each member. Over the long-term, a member may be profitable for an insurance company if the member pays more in premiums than they receive in benefits. A member may also cost the insurance company a small amount by receiving more benefits than the premium they pay. There are also member who are high-loss member because they are on the receiving end of a medical disaster and end up receiving much more in benefits than the premium they pay. The table in FIG. 1 divides member age into seven age ranges. Members fall into one of the following seven ranges: ages 0-9, ages 10-19, ages 20-29, ages 30-39, ages 40-49, ages 50-59, and ages 60-69. For each age range, the table presents the average member profit 107, which is the average profitability for a member in each age range expressed as an actual dollar amount.

As FIG. 1 shows, average member profit 107 tends to increase with age range. Older members tend to be more profitable for insurance companies. This is further reflected in the table, where it can be seen that members between the ages of 0-29 make up the majority of the small-loss grouping 103. However, the table also illustrates that members between the ages of 40-69 make up the majority of both the high-loss grouping 101 and profitable grouping 105. So while older members tend to be more profitable for insurance companies, the members that cost the insurance companies the most money also tend to be the older members. As a result, risk and profit go hand-in-hand for insurance companies, who simultaneously bear the risk of the high-loss grouping 101 in order to make profits from the profitable grouping 105. Thus, an insurance company has much to gain if they could use non-clinical features or data in creating a data model that can separate the high-loss members from the profitable members in advance of predicting the overall profitability of an individual.

Although clinical data can be used, the use of non-clinical data is preferred for two reasons. First, clinical history only exists for existing members for an insurance company. The use of clinical history would allow only for predicting the profitability of existing members, limiting the use of a predictive model for new or potential customers. Second, a limited clinical history may be only informative in the short-term, and thus misleading in comparison to the use of demographics data when predicting long-term profitability.

One technique that would be well-suited for predicting overall profitability may be a segmented linear regression. A segmented linear regression is a piecewise regression that partitions all the various independent variables into intervals and fits a separate line segment to each interval. A segmented regression is particularly useful when the independent variables, once clustered into different segments or groups, possess different relationships between themselves in each segment or region. The added complexity of a segmented regression can be worth the potentially improved predictive capability.

FIG. 2 is a general overview of the improved system for predicting overall profitability. Third-party data 201 may be a broad database obtained from a third-party that contains data corresponding to various descriptor variables that are used in generating the model. In some embodiments, third-party data 201 may consist of state-wide demographic, behavioral, or regional information. Third-party data 201 is first normalized 205 in order to make the data values for all the individuals in the dataset between 0 and 1, which allows for a better comparison between the individuals.

First-party data 203 is a database that contains known values of the dependent variable that the model is attempting to predict. First-party data 203 also contains values for the descriptor variables chosen. The individuals in first-party data 203 may be a subset of the individuals in third-party data 201. In some embodiments, first-party data 203 may be a database that contains the actual, known profitability of existing members or health insurance customers.

A matched set 209 is then produced, where the third-party data 201 is matched to each individual member whose actual profitability is contained within first-party dataset 203. Third-party data for non-members, or for individuals who are unable to be matched to an actual profitability contained within first-party data 203, would play no role in generating the data model and would be temporarily cast aside. However, it should be noted that the third-party data for non-members becomes useful once the data model has been generated. Since the descriptor variables for the model are generated from the third-party data 201, which can be a state-wide database containing demographic data, any individual in the database for third-party data 201 can be scored for profitability regardless of whether they are a member or not. This is a big advantage to using a matched set comprising third-party data 201 and first-party data 203 over only the use of first-party data 203 on the company's own customers.

In order to produce this matched set, third-party data 201 and first-party data 203 undergo a fuzzy match 207. A fuzzy match is performed here to match individuals between the two datasets by matching name and location. The third-party data 201 is married to the first-party data 203 using keys such as first name, last name, and address fields such as postal code. The goal for the system is to attempt to match or correspond the third-party data for a specific individual to that individual's first-party data containing known profitability. Fuzzy matching allows word-based matching queries to find matching phrases or sentences from a database. When an exact match is not found for a sentence or phrase, fuzzy matching searches a database to find derivatives with an approximate match in meaning or spelling. Possible approximate matches for the queried word are returned with a matching percentage between a threshold percentage and 100 percent. In other words, fuzzy matching would return a match which, although is not a 100 percent match, is above the threshold matching percentage set by the user of the system.

For example, the model may be attempting to calculate the profitability of a customer listed under the name "John Smith." However, the data obtained from a third-party provider may include data for that specific person under the name "Johnathan Smith." In order for the third-party data needs to be matched up with the first-party data for this person, the system may recognize that the first names "Johnathan" and "John" are close enough such that the matching percentage is above a certain threshold, which may suggest the data pair refers to a singular individual.

After producing matched set 209, the matched set 209 is resampled 211 at random in order to produce a test set 213 and a proof set 215. Resampling 211 compensates for the fact that the fuzzy matching process may be biased, and it forces the matched individuals in the matched set 209 to resemble the state-wide population or population presented in third-party data 201.

Test set 213 is then used to generate the data model 217. Generating data model 217 and powering the model can be done using various machine learning techniques or engines, with the ultimate goal of predicting individual or household profitability based on non-clinical risk factors. These machine learning techniques can predict profitability with high precision through the combined use of an external, third-party dataset 201 and an internal, first-party dataset 203. As more data is provided to the algorithm in the test set 213, the model becomes more precise. In various embodiments, the machine learning regression technique may be a decision tree, random forest, support vector machine, or neural network. The machine learning regression technique may be performed with or without adaptive boosting. In some embodiments, the model may be comprised of various machine learning engines that may be tested, evaluated, and re-evaluated as new data becomes available, in order to choose the optimal engine that produces the best results. Multiple machine learning techniques may be combined in an ensemble that allows multiple models to vote on a final outcome. In some embodiments, the data model is powered using a decision tree engine (a generic machine learning optimizer) as the specific machine learning algorithm.

In some embodiments, the data model generated may be based on a segmented regression. In some embodiments, the data model generated may actually be an aggregated model. In some embodiments, this aggregated model may be two or more segmented regression models with different dependent variables, performed sequentially in order to produce more precise results. The dependent variables may be different, but related in some way. For example, recall that one issue faced by insurance companies is that high-loss individuals are difficult to distinguish from profitable individuals. This system can get around that problem through the use of two or more segmented regression models performed sequentially. For example, an aggregated model with two models would use a first model that predicts profitability of each individual, and a second model that is designed with a simpler task of predicting whether an individual will be a disaster. Each individual is essentially scored twice, once by each model, and the second model is used to filter out the predicted high-loss individuals. Here, the first and second models are predicting two related, but distinct, outcomes. The first model predicts profitability with high precision, but low statistical power. The second model predicts disaster with lower precision, but high statistical power. The pairing of the first and second models in this manner as disclosed represents a great improvement over simply using multiple generic models, which would face difficulty in separating the profitable and high-loss individuals.

There are many options for the different models chosen to be included in the aggregated model, and a specific type of model can be chosen for a specific task. Combining models with specific tasks in this manner can lead to improved results over just combining generic models or choosing models at random. A profitability model has high precision but low statistical power, but it can be utilized with additional models that have higher statistical power when more accuracy is needed. These additional models with higher statistical power are helpful in determining disaster-prone individuals, but may be insufficient on their own in predicting profitability. Some examples of such models could include profitability, decile, trinary, or binary models. Thus, a binary model could be used to classify individuals as high-loss individuals or not high-loss individuals. Or more granularity and precision may be desired, so a trinary model could be chosen that has three groupings. Individuals could be classified into three categories, such as high-loss, medium-loss, or low-loss individuals. The categories, classifications, or groupings can be defined in any manner based on the model's specific task. If more granularity and precision is desired, additional categories, classifications, or groupings can be introduced into the model. Thus, instead of a trinary model, a quaternary model (with four classifications), decile model, or profitability model may be used, and so forth.

After the model is generated in step 217, the data model can be validated at step 219 using the proof set 215, which was not utilized in generating the data model 217. The model is applied to proof set 215 to produce predicted profitability for the individuals in the proof set 215. The predicted profitability can be compared against the actual, known profitability of these individuals in proof set 215, since proof set 215 is comprised of some of the first-party data 203 containing actual profitability.

Once the model has been properly evaluated, the model can be applied to new cohorts 221. This is accomplished by taking pipeline data 225, which typically contains the same data fields or variables present in third-party data 201 that were used as descriptor variables in generating the data model. Thus, pipeline data 225 can consist of the existing third-party data for individuals that are not in matched set 209. This illustrates how the model can be immediately applied to the non-member individuals in third-party data 201. However, pipeline data 225 can also consist of an entirely new dataset. For example, if the data model was generated using 2014 data, then pipeline data can be more-recent population data from 2015. This pipeline data 225 may be first filtered for relevance 227 before being inputted into the model. Filter for relevance 227 is an optional step that can be used to filter and limit pipeline data that is overly broad. Filtering would allow for testing of desired subpopulations (such as new members, applications, leads, or the remaining state population that are not customers). For example, the pipeline data may contain state-wide population data from the last decade but can be filtered in order to only look at 2015 population data for non-members, in order to generate possible leads.

Afterwards, the model would produce predictive results for the new cohorts. Those results can be displayed to the end user to interpret and visualize 223. For instance, the results can be displayed after being ranked and ordered by profitability. The results can be displayed on a map when paired with address data. This can all be achieved using a user-friendly graphical user interface that allows an end user to use the results without having played a role in generating or validating the data model.

Segmentation and Decision Tree Modeling

Figure 3:
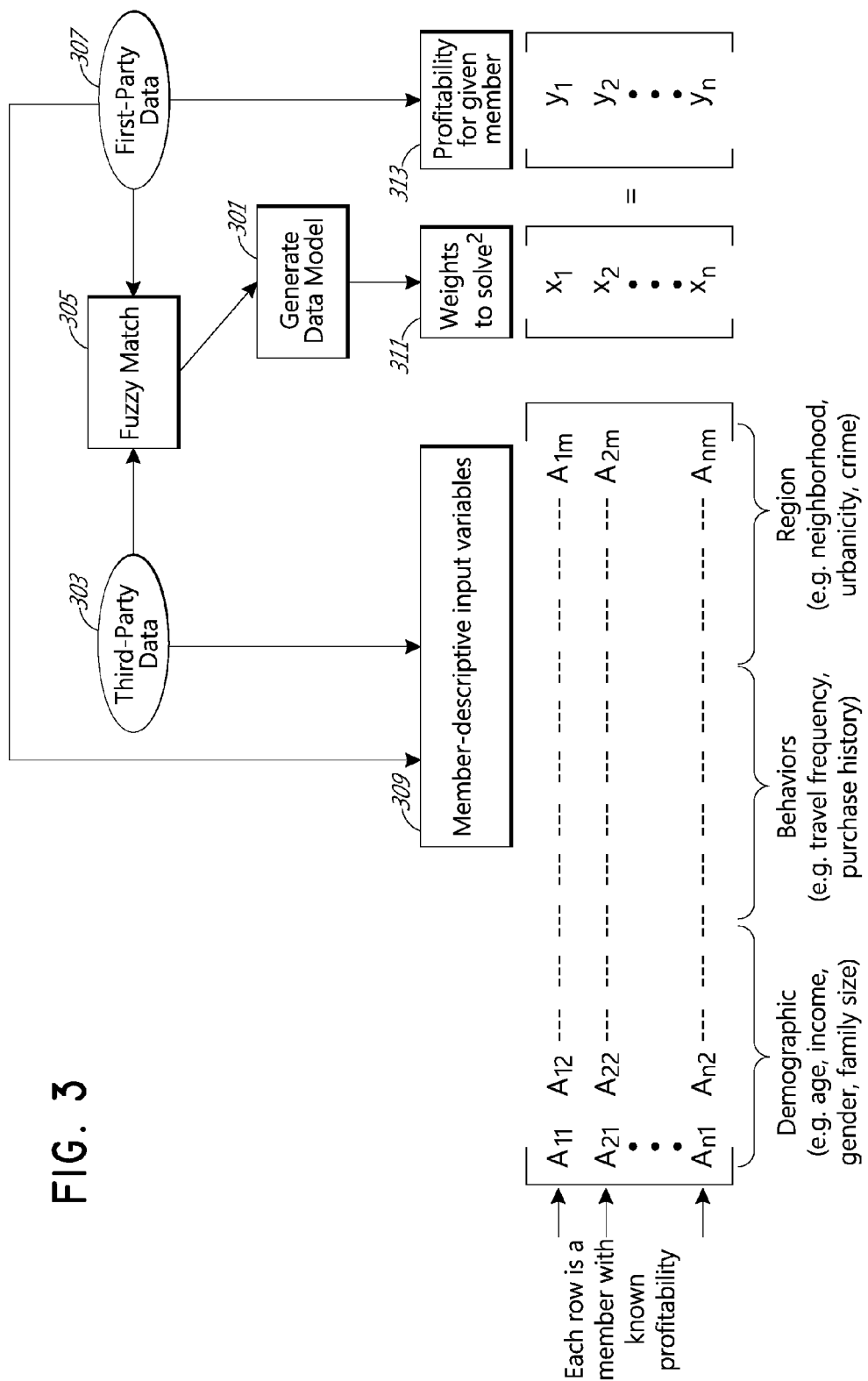
FIG. 3 is a flow chart that depicts how an improved data model may be generated.

FIG. 3 illustrates how a data model 301 may be generated by performing a segmented linear regression on multivariate data for existing members. In FIG. 3, data model 301 is a decision tree model that is generated using a matched-set of first-party data 307 and third-party data 303 for existing members.

First-party data 307 may contain the actual profitability for each existing member 313, which can be expressed as a matrix. Similarly, third-party data 303 and first-party data 307 may contain all the data fields for member-descriptive input variables 309, which may be visualized as a matrix of all the information for the descriptor variables. The descriptor variables are the independent variables which identify the individuals, and they are typically identified and included in a data model for their potential predictive capability. As an example, the descriptor variables may consist of demographic characteristics of the individuals along with the family or household they belong to (e.g., age, income, gender, family size), the behavioral characteristics of the individual (e.g., their travel frequency, purchase history, risk-seeking propensity), and the regions or settings that observations are made (surrounding properties, neighborhoods, cultures, urbanicity, crime).

Combining third-party data 303 and first-party data 307 into a matched-set may first involve data processing 305. Step 305 may include normalizing the third-party data 303, performing a fuzzy match, and resampling into a proof set and a test set. The test set may be used to generate the data model 301.

As can be seen from the figure, in order to generate data model 301 based on a linear regression, the weights for the descriptor variables in weights to solve 311 need to be solved for. However, there is an added step in a segmented regression. The decision tree model firsts attempt to autosegment the various descriptor variables, such as age, by identifying intuitive segments and placing each individual into a segment. Afterwards, the decision tree model would then solve for the weights shown in weights to solve 309 for each segment, allowing for the creation of a linear regression model for each segment. Thus, FIG. 3 illustrates only the generation of the data model. In this step, one or more segmented regression functions are fitted and generated from the available first-party and third-party data.

Although not pictured in this figure, after the data model is generated it may then be applied and ultimately used to not only predict the overall profitability of existing members, but to predict the overall profitability of the individuals or households in a population—including the profitability of non-members—as well. The model may be capable of further ranking, ordering, and filtering individuals based on their predicted overall profitability.

Figure 4:
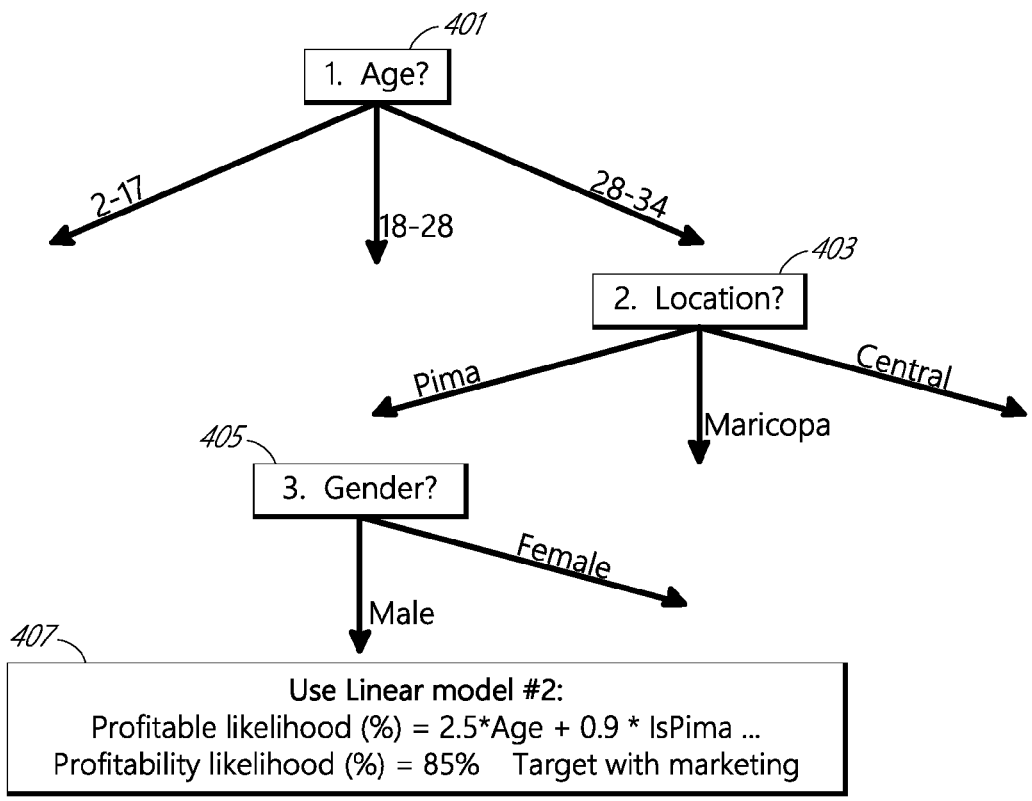
FIG. 4 illustrates a diagram showing how the improved data model can predict profitability of any individual in a population.

FIG. 4 illustrates how a segmented regression based on a decision tree model could be used in order to apply the discovered relationships to calculate the profitability of any individual in the general population (and not just existing members). In this example, the model could be applied to predict the profitability of a 30 year old male located within Pima.

At the age inquiry step 401, the decision tree evaluates the age of the individual. Since the individual's age of 30 falls into the 28-34 bucket, the decision tree goes onto the next step which is location inquiry 403. The decision tree determines that the individual is located in Pima and then goes onto the next step, which is gender inquiry 405. After determining the individual is a male, the decision tree is able to place the individual within the segment corresponds to linear model #2. Linear model #2 is then applied to this specific individual at step 407 to make a prediction. In this manner, the decision tree is mapped out for the various segments and their corresponding linear models.

At step 407, the values for the individual are plugged into the regression function with the solved weights for that segment. The result is a profitability likelihood of 85%, which may be above some set threshold that flags the individual to be automatically targeted with marketing materials based on their high profitability likelihood. However, this expression of profitability is not meant to be a limiting example of how profitability can be expressed; the overall profitability can be expressed by the model in various ways. In some embodiments, the overall profitability can be expressed as an exact profitability in dollar amounts that the person would potentially earn or cost the company. The overall profitability may also be presented as a profitability score, based on a monotone function that preserves the ranking and order of profitability for a dataset. Or the overall profitability may be expressed as a profitability decile or percentile.

FIG. 5 further illustrates an example of how segmented regression can be used in a data model to predict profitability. The decision tree segmentation 501 results can be seen in the figure. The decision tree identified thirteen intuitive segments, which are listed in bold with the format: LM#. For example, linear model 1 is shown as "LM1" and it is the linear model generated for a segment where the normalized max age in the household <=0.154 and the normalized number of people in the household <=0.019.

In the figure, linear model 7 or "LM7" is described in more detail to show the actual weights solved by the model in the description of linear model seven 503. Description of linear model seven 503 shows how the segment covers individuals that are typically older and live in rural areas, with the criteria for the segment defined as normalized max age in the household >0.551 and normalized for a census-reported county size of <=0.25. The various weights for the different descriptor variables can be seen in the description of linear model seven 503.

Linear model seven represents the equation for which the values for a given household can be inputted in order to calculate a profitability decile (with lower value being more profitable), so long as the individual meets the criteria for fitting under that segment. In the description of example application 505, two examples are provided that are older, rural households that linear model seven can be applied to. All other things held equal between the two examples, a rural family with a head of household aged 36 could be calculated to be within the second decile for profitability (i.e., more profitable) than the same family with a head of household age 60, which would be in the fourth decile for profitability.

Testing the Model

Figure 6:
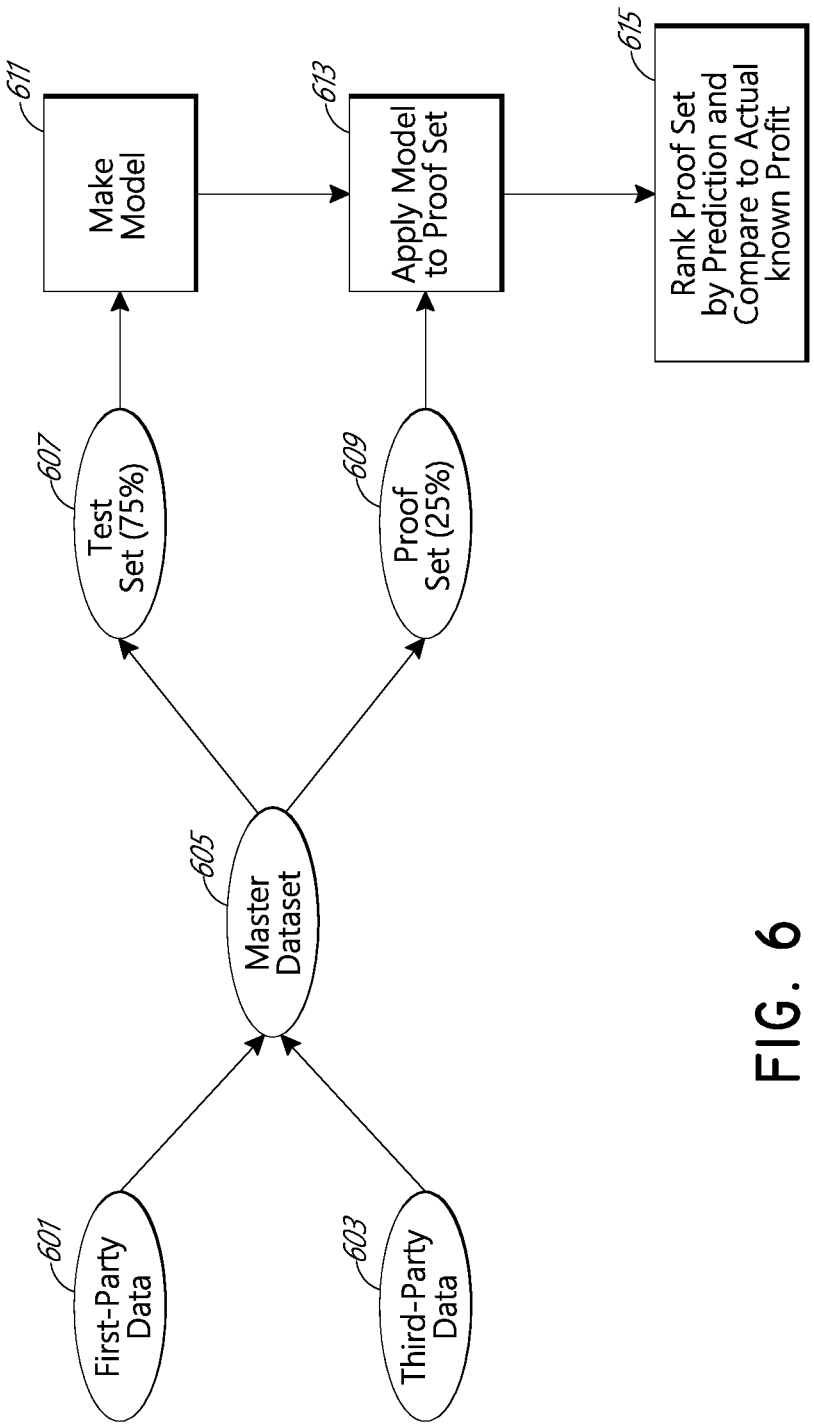
FIG. 6 illustrates a flow chart detailing how the improved data model may be tested and evaluated.

FIG. 6 illustrates in further detail how the predictive data model may be tested and evaluated. First, the first-party data 601 and third-party data 603 is combined into a matched, master dataset 605, using methods such as normalizing and fuzzy matching as previously described herein. This combined, "supervised" master dataset 605 is then randomized and resampled into a test set 607 and a proof set 609. Resampling compensates for the fact that the fuzzy matching process may be biased and forces the matched individuals to resemble the state-wide population that makes up third-party data 603.

In the figure, test set 607 is represented as comprising 75% of the master dataset 605, and proof set 609 is represented as comprising 25% of the master dataset 605. This can be accomplished by generally assigning data to either the test set 607 or the proof set 609 via a random number generator. However, it is important that this assignment or resampling is done at random such that the test set 607 and proof set 609 are comparable populations. The figure shows a test set 607 that comprises three times as much data as proof set 609. However, this is merely an example and test set 607 and proof set 609 need not adhere to this 3:1 ratio. Test set 607 may be a subset comprising any percentage of the master dataset 605, with the proof set 609 comprising the rest of the data. However, one skilled in the art will recognize that it is advantageous for test set 607 to comprise a large portion of the master dataset 605 because only the test set 607 is used to generate the model, and the model becomes more precise as more data is used to generate it.

Once test set 607 is used to make the model 611, the model can be evaluated by applying the model to the proof set 613 in order to cross-validate the predictive capability of the model against the proof set 613, which consists of data held separately from the creation of the model in step 611. The validation is performed by ranking the proof set by predicted profitability and comparing that data to the known profit of the individual in step 615. Upon confirming the predictive capability of the model, the model can then be applied to new cohorts.

Aggregated Model

The results from the data model can be further improved by using an aggregated model that actually consists of two or more models performed sequentially. In some embodiments, both of these sub-models can be based on a segmented regression performed by the decision tree engine as described so far. In some embodiments, the two models or more are configured to predict different, but related, dependent variables. The use of the two models allows for overcoming the difficulty in separating high-loss, disaster-prone individuals from the highly-profitable individuals. This is because in practice, it is easier to give models simpler tasks. The second model can be a binary disaster model tasked with the simple job of identifying and filtering out the high-loss "disasters" from the "non-disasters", which can be performed with high accuracy. Thus, the first model is combined with an additional model designed to catch the disaster-prone customers and is preferable to having just a singular model, which may have difficulty identifying the customers who are both highly profitable and not disaster-prone.

Figure 7:
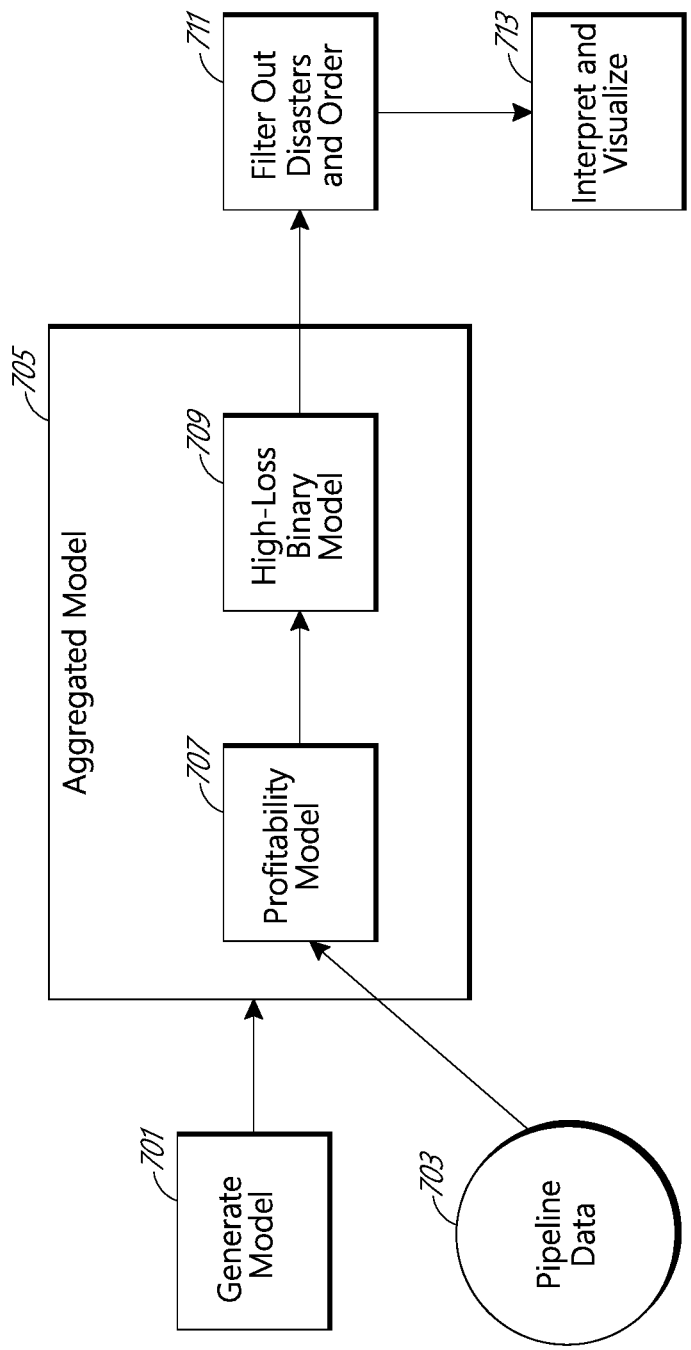
FIG. 7 illustrates one embodiment of an aggregated model consisting of two models performed sequentially.

FIG. 7 illustrates an embodiment of an aggregated model consisting of two models performed sequentially. In the figure, generating the model 701 may consist of steps already outlined in this specification, such as having the third-party and first-party data being merged into a matched set and a segmented regression being performed on a test set that is a subset of the matched set. However, in this figure the key difference is that aggregated model 705 is actually a combination of a profitability model 707 and a high-loss binary model 709.

The profitability model 707 calculates the predicted profitability of an individual. In some embodiments, profitability model 707 can be a decile profitability model designed to output predicted profitability of individuals as a decile. Profitability model 707 may also order and rank individuals based on profitability, or this may occur at step 711 as shown in the figure. After the profitability model 707 is used to calculate the overall profitability of each person, a second model can be applied to determine whether each person is a "disaster" or "non-disaster."

This second model, the high-loss binary model 709, can be an inherently probabilistic, binary model. This model could take each individual and calculate a probability or likelihood that the person would be a disaster, in order to classify the person as either a "disaster" or a "non-disaster" based on some disaster threshold.

This classification can be performed by comparing the disaster probability against an arbitrary cutoff or threshold. For example, the expected rate of disasters in a pool of individuals could be 10%. If an individual has a calculated probability of disaster of 12%, then that individual is more likely than normal to be a disaster and could be classified as a disaster. A probability under the threshold would result in the individual being classified as not a disaster. Thus, this second model classifies individuals in one of two categories, without a fine gradation.

The second model could consist of a linear regression, or segmented linear regression, that is capable of interpolating between points. By providing the model addition training sets for disasters, or more examples of what kinds of individuals fall under each classification, this model would become more precise. This model is especially effective at predicting high-loss households and disaster-prone individuals and can serve to filter the results of the profitability model 707

When using the two models together, everyone is essentially scored twice—once for profitability and again for disaster. For example, the first model would calculate the individual profitability over time for a list of customers. The second model would then determine whether each of those customers is a disaster. Some of those disaster-prone customers would be filtered out from the list at step 711, along with prioritizing the results by profitability. Thus, the end output format of the aggregated model 705 may be the same output format as profitability model 707. If the profitability model 707 outputs a profitability decile for each individual, then the aggregated model 705 may also list the profitability decile for a list of customers with some disaster-prone customers filtered out, ordered with descending profitability. Then, this list could visualized and interpreted 713 by a marketing or sales team to solicit the most profitable customers first.

Figure 8:
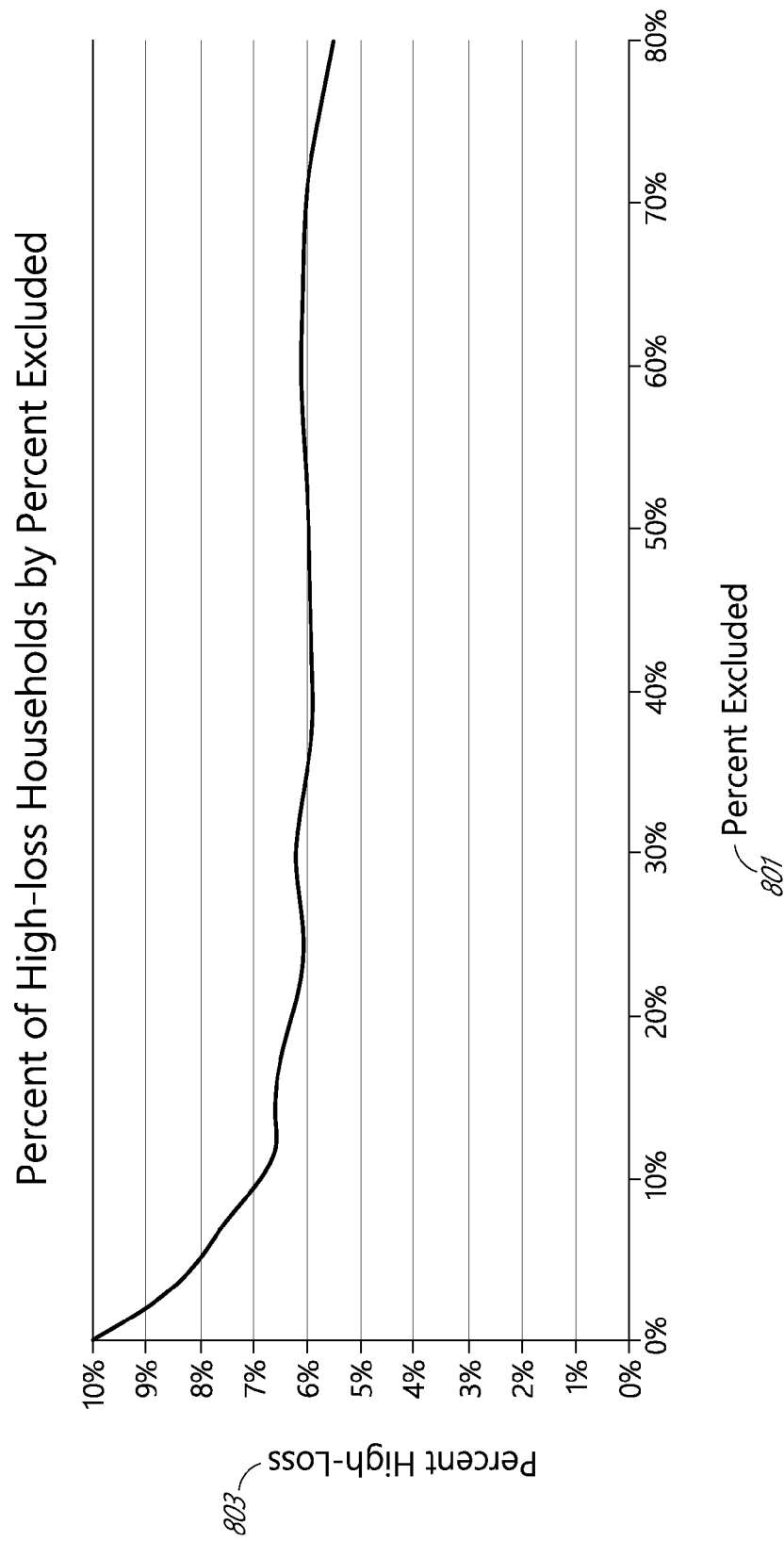
FIG. 8 illustrates a graph of how the amount of high-loss households can be reduced once identified by an aggregated data model.

FIG. 8 illustrates how using an aggregated data model can reduce the amount of high-loss households in the member base. The X-axis shows the percentage of high-loss households excluded from the results 801 against the Y-axis which shows the remaining high-loss households as a percentage of the customer base 803. As the figure shows, random targeting would result in 10% of customers being high-loss disaster cases. This is the result when not using an aggregated data model and just scoring individuals once for profitability without excluding any (corresponding to zero percent of high-loss households excluded 801 shown on the X-axis).

However, the addition of a high-loss binary model to essentially filter out some high-loss households greatly reduces the percentage amount of high-loss households in the customer base. Using the binary disaster model to filter out the worst 20% of what it considers as high-loss individuals, the actual percentage of high-loss households is reduced by 40%, with the percentage of high-loss households within the customer base going from 10% to 6%. This signifies that the binary disaster model is highly accurate in detecting disasters, which carries over to the aggregated model where the binary disaster model is used sequentially after profitability scoring. Thus, the aggregated model would preserve the same decile level profitability accuracy from the profitability scoring, but gains the 40% detection accuracy of high-loss households when flagging top 20% "high disaster risk" households as a cutoff. In other words, the aggregated model can identify 40% of incoming disaster households based on non-clinical data. This can be confirmed using the proof dataset to verify that the actual profitability is within the predicted decile for all the individuals with known profitability not used in model construction.

End Uses

Figure 9:
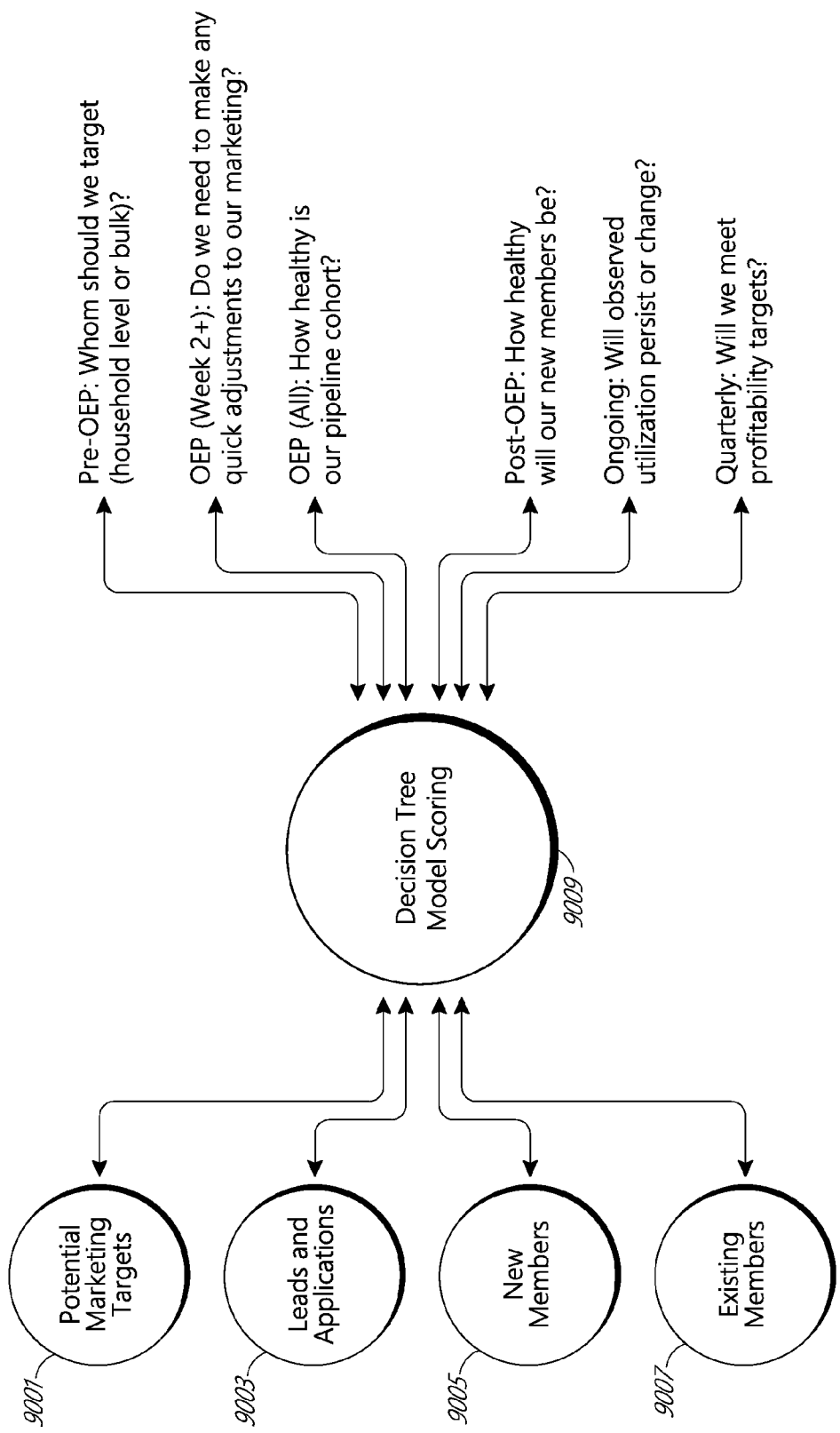
FIG. 9 illustrates a flow chart detailing how the use of non-clinical data allows for improved data model to be applied to an entire population.

FIG. 9 illustrates how the use of non-clinical data allows for the predictive data model 9009 to be applied to various cohorts in a population. It also provides a sample of some of the business questions that can be answered to show why being able to apply the model 9009 to non-existing members is so important.

The decision tree model 9009 can score and rank the profitability of all the individuals in a population, not just existing customers. This can be made possible because the model can use a state-wide, third-party database for descriptor variables (rather than just data for existing customers). Thus, various cohorts or groups of individuals that can be scored are shown in the figure, including potential marketing targets 9001, leads and applications 9003, new members 9005, and existing members 9007. If the model was generated using clinical data, then it could only be applied to existing members 9007 since that is the group that a clinical history would exist for. Thus, depending on the availability of third-party data for a given individual, the decision tree model 9009 is able to score the profitability any individual in a given population.

Furthermore, it allows model 9009 to help guide important business decisions, such as through identifying deep segmentations within the target population and their relationships to profitability. The model can be used to power a predictive dashboard or user interface that is capable of quickly evaluating pipeline profitability, such as leads or new insurance subscribers. This model can be used to guide marketing or sales efforts by defining or prioritizing target populations at the household level in order to acquire new customers. In other words, once individuals are ordered based on overall profitability, marketing or sales efforts can be directed towards the most profitable individuals in the population. The model can be used to anticipate members or existing customers at risk for disease progression, so that care management can be recommended to them. The model can be used to predict churn risk at the household level, so that more sustainable insurance products or policies can be recommended.

Additional key business questions that can be answered are provided in FIG. 9. These questions include: whether targeting should occur at the household level or bulk, whether any quick adjustments need to be made to the marketing, how healthy the pipeline cohort is, how healthy new members will be, whether observed utilization will persist or change, and whether the company will meet profitability targets for the quarter.

Figure 10:
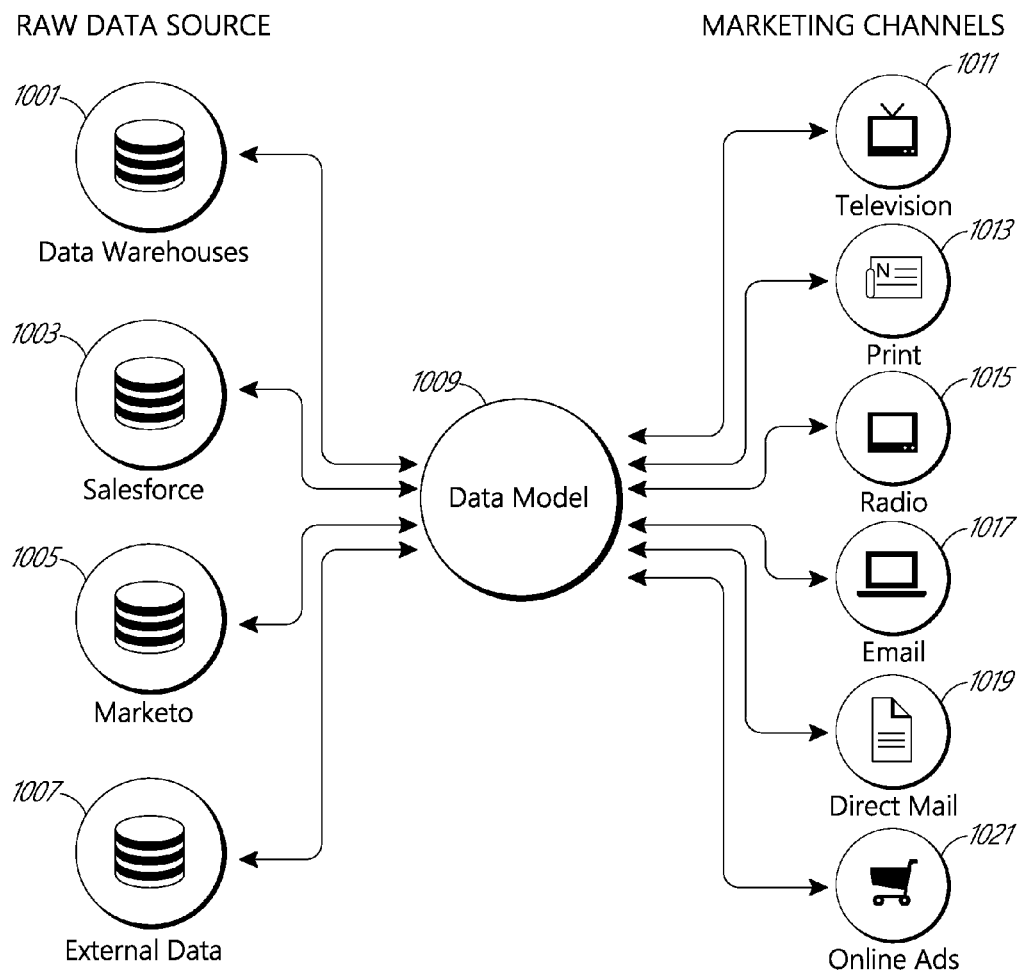
FIG. 10 illustrates a flowchart depicting the various data sources and marketing channels configured for use with the improved data model according to one embodiment.

FIG. 10 illustrates some of the various data sources for the model 1009 and various marketing channels that can be powered by the model 1009. To supply the data for the cohorts or the different types of individuals, the data can be sourced from data warehouses 1001, which can be central repositories of integrated data from one or more disparate sources. The data may comprise external data 1007, which may exist on a physical medium such as a hard drive or optical disc. The data may also comprise data in an intangible format such as data stored on a cloud service. Another data source may be Salesforce data 1003, or data from a similar provider of customer relationship management products. Another data source may be Marketo data 1005, or a similar provider of marketing automation software or marketing management software.

The model 1009 can be applied to data from these various sources, and the results can be leveraged by tools to perform an action or business function. As just one example, the model results can be used to power different marketing channels, such as television 1011, print 1013, radio 1015, email 1017, direct mail 1019, and online ads 1021. The model can be used with tools in order to optimize the marketing for member targeting and conversion. For example, the model could sort all the households in a neighborhood by profitability and be configured to target the top 80% of households by profitability, a threshold which may be set by user preference. A targeted advertisement could be then delivered to those households. The specific product, advertisement, marketing channel, etc. could be selected based on the characteristics of the household or the individuals in a household. For example, if a household has a relatively young average age then an insurance product attractive to a younger demographic could be marketed to that household via an advertisement and channel that resonates with a younger demographic, such as email or online advertisement.

Figure 11:
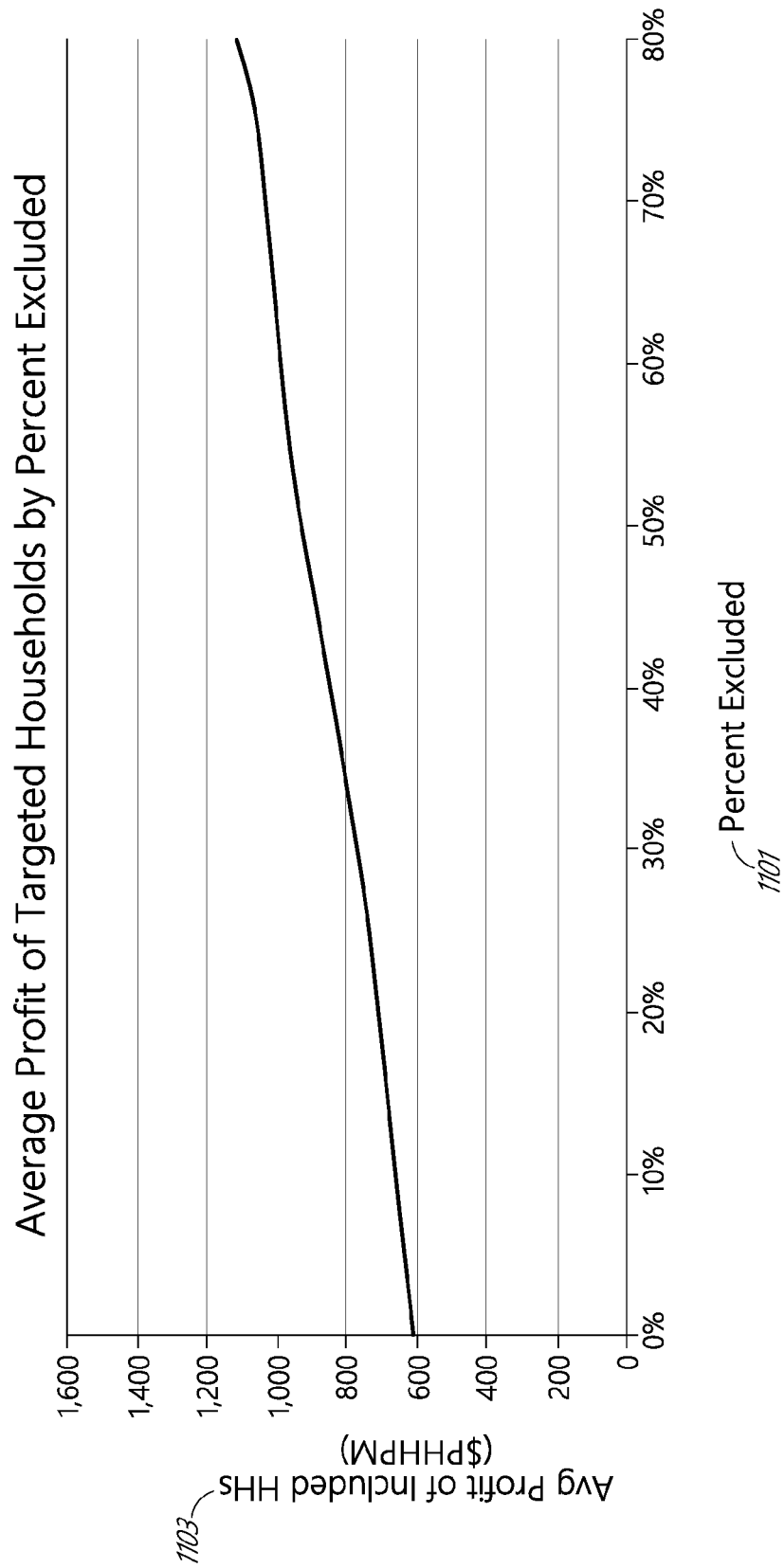
FIG. 11 illustrates a graph showing how the improved data model can be used to identify predicted lower-profit households for exclusion, suppression, or other mitigation strategy.

FIG. 11 is a graph that illustrates an example of how the predictive data model can be used to help exclude predicted lower-profit households in order to achieve improved profitability from the remaining targeted households. The X-axis represents the percentage of low-profit households excluded 1101, and the Y-axis represents the average profit of the included households 1103 as a dollar amount. The graph shows that the average profitability steadily increases with a tighter targeting of households from excluding the lowest-profit households first. The model is used to rank household profitability, order the households based on profitability, and exclude the bottom 50% of households by profitability. The result is that the average profit from the remaining households increases about 50% from $600 to approximately $900. The plot of FIG. 11 may also be an evaluation tool, or method of evaluating the performance of a regression model in terms that are intuitive to a business executive, as making machine learning model performance interpretable is generally considered difficult. If the plot shows a linear relationship on out-of-sample testing, such as the linear relationship shown in FIG. 11, the model is considered to be predictive. If the plot is instead a flat, horizontal line such that the Y-axis showing the average profit of targeted households remains constant, then the model is considered to have failed. Evaluation tools exist for classification, rather than regression, and those are also difficult to interpret.

Figure 12:
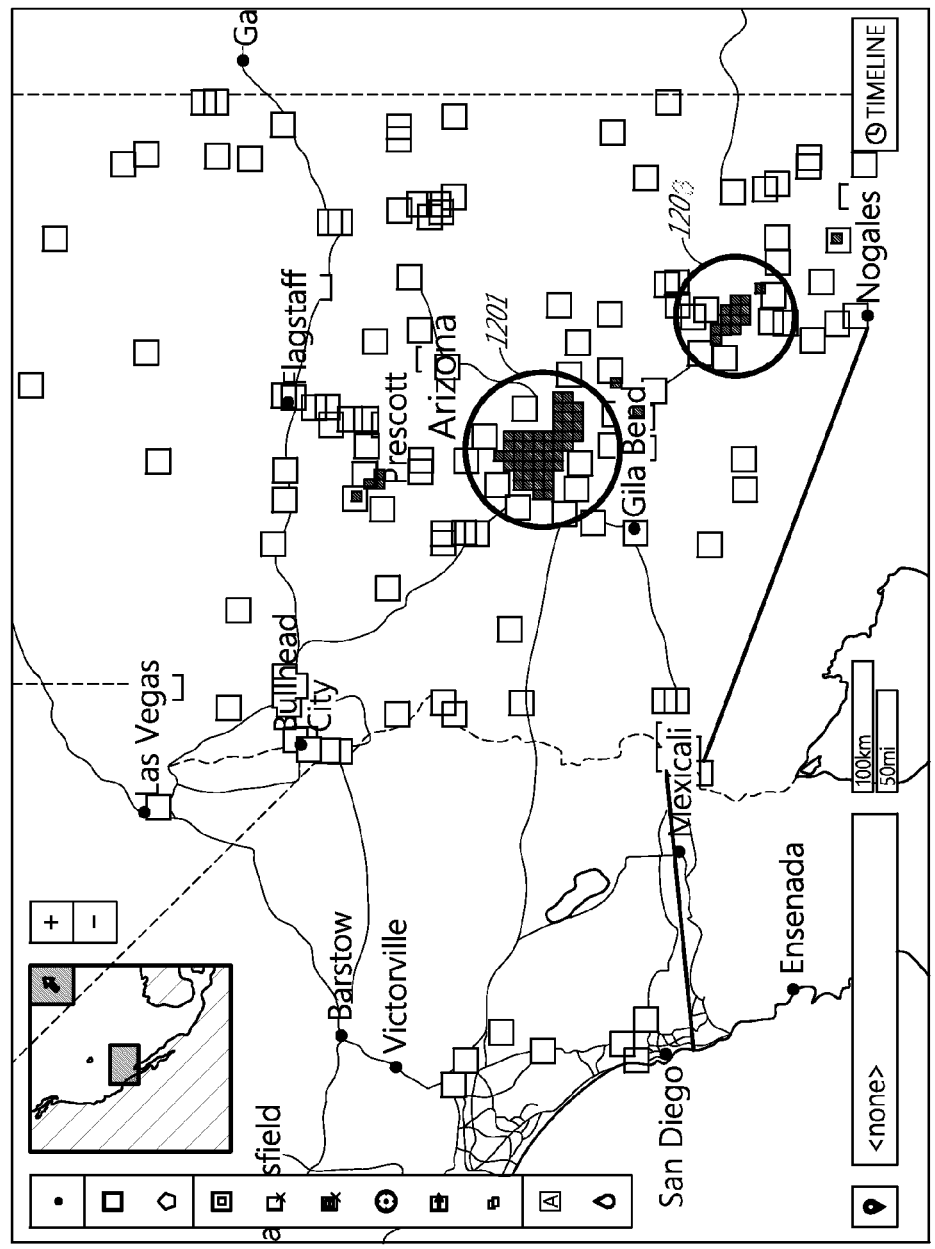
FIG. 12 illustrates how third-party data containing the addresses of individuals can be used with the aggregate data model in order to provide a user interface or map visualization according to one embodiment.

FIG. 12 illustrates how third-party data containing the addresses of individuals can be used with the aggregate data model in order to provide a user interface or map visualization with a house-by-house resolution. In some cases, the third party data used by the system may already contain demographics data such as the addresses of individuals. Thus, the profitability of individuals or households can be presented on a map based on the corresponding address or location of that individual or household. Alternatively, the profitability of entire neighborhoods can be presented on the map based on the profitability of that neighborhood's constituent households and the corresponding location of that neighborhood.

In some embodiments, the method of presenting this information may involve resolving the profitability against buckets of profitability ranges, and then assigning a color to the graphical representation of an individual, household, or neighborhood's profitability based on the profitability range. For example, an extremely profitable neighborhood may be visually represented on the map as a green icon or dot.

In some embodiments, the profitability of all the individuals or households in an entire neighborhood may be visually presented on the map. There may be one or more neighborhoods represented on the map or user interface. These neighborhoods may cluster around each other to form one or more cities. This will allow a user of the system to quickly see differences between the profitability of various neighborhoods. The user of the system could leverage this capability to engage in marketing campaigns for the more profitable neighborhoods, such as by putting up a billboard within the neighborhood. The user could also do further research on what makes specific neighborhoods more profitable than other neighborhoods, or what descriptor variables are causing the differences. The user could also do further research on the distinguishing characteristics between cities.

For example, FIG. 12 shows graphical profitability representations for two cities, first city 1201 and second city 1203. Each city is comprised of tiled representations of individual neighborhoods. In this embodiment, a user can look at the overall colors for first city 1201 and second city 1203 to quickly determine which city is more profitable. Within each city, a user can also compare different neighborhoods.

As a further example, the user might see two adjacent neighborhoods with greatly different overall profitability and decide to do additional research on these two specific neighborhoods to try and account for the difference. The user might then realize that the median age in the more profitable neighborhood is significantly higher than the less profitable, adjacent neighborhood. With this information, the more profitable neighborhood could be prioritized first for soliciting new customers. Additionally, the marketing strategy or solicitation method may be specifically chosen to target the characteristics of that neighborhood. For example, advertisements in public spaces—billboards, posters, etc.—could be designed to target a younger audience in the less profitable neighborhood and designed to target an older audience in the more profitable neighborhood.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface (GUI), among other things.

Figure 13:
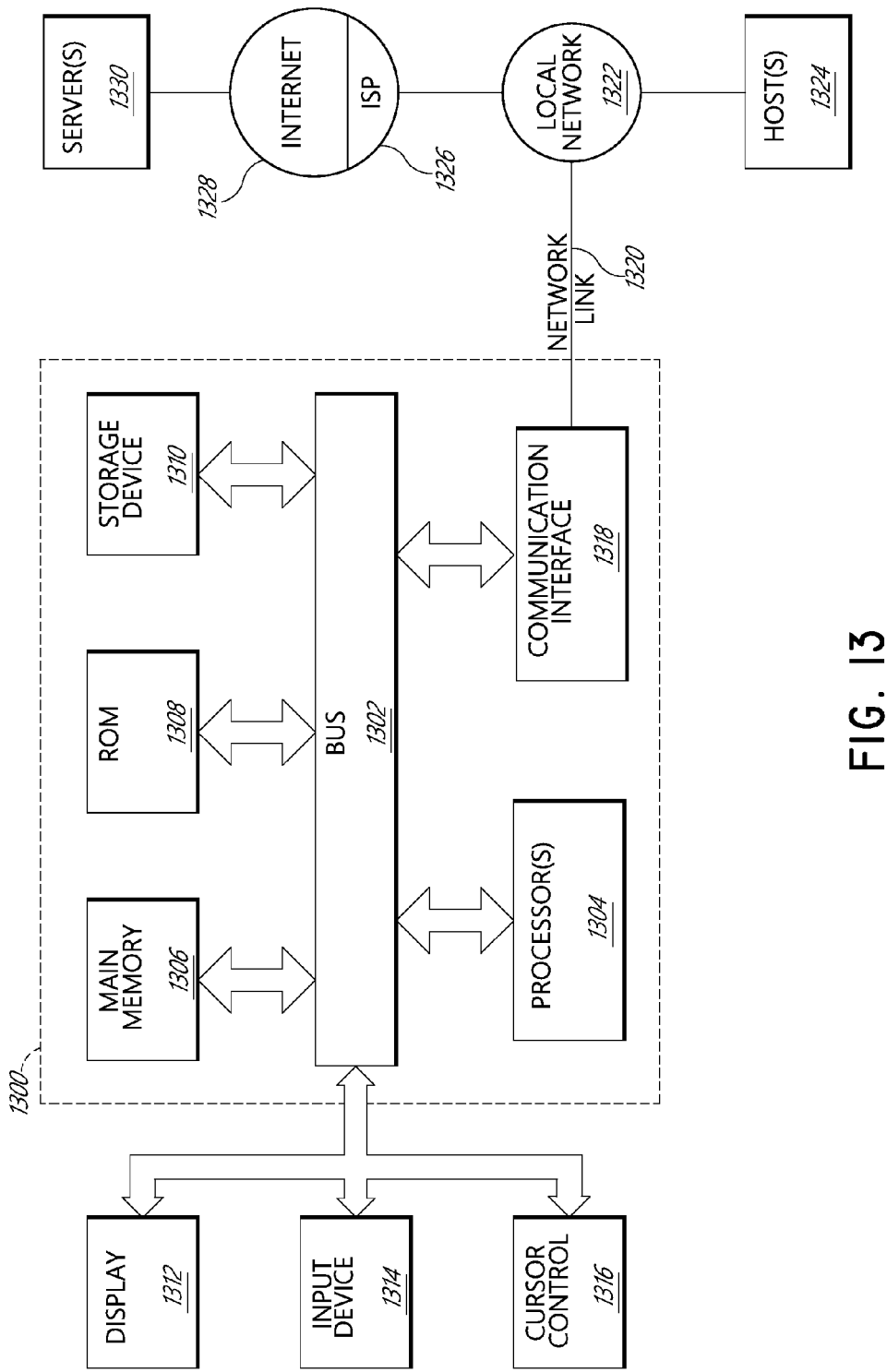
FIG. 13 illustrates one embodiment of a computer system with which certain methods discussed herein may be implemented.

For example, FIG. 13 is a block diagram that illustrates a computer system 1300 upon which an embodiment may be implemented. A computing device may be used to process the various data, generate the data model, test the data model, apply the data model, and interpret or present the results visually to an end user. The computing device may include some or all of the components and/or functionality of the computer system 1300.

Computer system 1300 includes a bus 1302 or other communication mechanism for communicating information, and a hardware processor, or multiple processors, 1304 coupled with bus 1302 for processing information. Hardware processor(s) 1304 may be, for example, one or more general purpose microprocessors.

Computer system 1300 also includes a main memory 1306, such as a random access memory (RAM), cache and/or other dynamic storage devices, coupled to bus 1302 for storing information and instructions to be executed by processor 1304. Main memory 1306 also may be used for storing temporary variables or other intermediate information during execution of instructions to be executed by processor 1304. Such instructions, when stored in storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or USB thumb drive (Flash drive), and so forth, is provided and coupled to bus 1302 for storing information and instructions.

Computer system 800 may be coupled via bus 1302 to a display 1312, such as a cathode ray tube (CRT) or LCD display (or touch screen), for displaying information to a computer user. An input device 1314, including alphanumeric and other keys, is coupled to bus 1302 for communicating information and command selections to processor 1304. Another type of user input device is cursor control 816, such as a mouse, a trackball, or cursor direction keys for communicating direction information and command selections to processor 1304 and for controlling cursor movement on display 1312. This input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computing system 1300 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor (s) 1304 executing one or more sequences of one or more instructions included in main memory 1306. Such instructions may be read into main memory 1306 from another storage medium, such as storage device 1310. Execution of the sequences of instructions included in main memory 1306 causes processor(s) 1304 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1310. Volatile media includes dynamic memory, such as main memory 1306. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may retrieve and execute the instructions. The instructions received by main memory 1306 may optionally be stored on storage device 810 either before or after execution by processor 804.

Computer system 1300 also includes a communication interface 1318 coupled to bus 1302. Communication interface 1318 provides a two-way data communication coupling to a network link 820 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN (or WAN component to communicate with a WAN). Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

TERMINOLOGY

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. And the inventions illustratively disclosed herein suitably may be practiced in the absence of any element which is not specifically disclosed herein. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computing system comprising:
   one or more data stores storing:
      a first dataset including first data items associated with respective individuals of a first plurality of individuals; and
      a second dataset including second data items associated with respective individuals of at least some of the first plurality of individuals, wherein the second data items include known profitability values associated with respective individuals;
   a computer processor; and
   a computer readable storage medium storing program instructions configured for execution by the computer processor in order to cause the computer processor to:
      access the first dataset and the second dataset;
      generate a training dataset by at least:
         performing a fuzzy match between the first dataset and the second dataset to identify a plurality of overlapping individuals associated with both the first dataset and the second dataset;
         for each individual of the plurality of overlapping individuals:
            adding, to the training dataset, first data items associated with the individual; and
            adding, to the training dataset, second data items associated with the individual;
      randomly divide the training dataset into a first subset of data items associated with respective of a first subset of the plurality of overlapping individuals, and a second subset of data items associated with respective of a second subset of the plurality of overlapping individuals;
      generate a first predictive model configured to determine a predicted profitability of an individual by at least:
         training the first predictive model based on the first subset of data items associated with respective of the first subset of the plurality of overlapping individuals; and
         validating the first predictive model by comparing predicted profitabilities of individuals of the second subset of the plurality of overlapping individuals with known profitability values of individuals of the second subset of the plurality of overlapping individuals;
      generate a second predictive model configured to determine a predicted likelihood of disaster of an individual by at least:
         training the second predictive model based on the first subset of data items associated with respective of the first subset of the plurality of overlapping individuals; and validating the second predictive model by comparing predicted likelihoods of disaster of individuals of the second subset of the plurality of overlapping individuals with known profitability values of individuals of the second subset of the plurality of overlapping individuals;

access a third dataset including third data items associated with a third plurality of individuals;

apply the first predictive model to the third dataset to determine predicted profitabilities of respective individuals of the third plurality of individuals;

apply the second predictive model to the third dataset to determine predicted likelihoods of disaster of respective individuals of the third plurality of individuals;

filter, based on the predicted likelihoods of disaster of respective individuals of the third plurality of individuals, the third dataset to determine a subset of the third plurality of individuals that are unlikely to experience a disaster;

determine an order of the subset of the third plurality of individuals based on their respective predicted profitabilities; and present a list of the subset of the third plurality of individuals that is ordered according to the order.

2. The computing system of claim 1, wherein the first data items in the first dataset comprise demographic data, geographical data, and/or behavioral data associated with respective individuals of the first plurality of individuals.

3. The computing system of claim 1, wherein training the first predictive model further comprises using a decision tree algorithm to perform a segmented linear regression on the first subset of data items associated with respective of the first subset of the plurality of overlapping individuals, and wherein training the second predictive model further comprises using a decision tree algorithm to perform a segmented linear regression on the first subset of data items associated with respective of the first subset of the plurality of overlapping individuals.

4. The computing system of claim 1, wherein the third data items in the third dataset comprise demographic data, geographical data, or behavioral data associated with the third plurality of individuals.

5. The computing system of claim 1, wherein the plurality of overlapping individuals of the training dataset is fewer individuals than the first plurality of individuals in the first dataset.

6. The computing system of claim 1, wherein performing a fuzzy-match between the first dataset and the second dataset to identify a plurality of overlapping individuals further comprises comparing an identifier of each individual in the first dataset to an identifier of each individual in the second dataset.

7. The computing system of claim 6, wherein the identifier comprises at least one of: a name associated with an individual, an address associated with an individual, a postal code associated with an individual, and a phone number associated with an individual.

8. The computing system of claim 1, wherein the first subset of data items of the training dataset is greater than approximately half of the data items in the training dataset, and wherein the second subset of data items of the training dataset is less than approximately half of the data items in the training dataset.

9. The computing system of claim 1, wherein the second predictive model is a high-loss binary model.

10. The computing system of claim 1, wherein the second predictive model is further configured to calculate the average likelihood of disaster in a group of individuals and compare it to the predicted likelihood of disaster of an individual in order to classify the individual as either a high-loss individual or a small-loss individual.

11. The computing system of claim 1, wherein the second predictive model is further configured to use the predicted likelihood of disaster of an individual in order to classify each individual as either a high-loss individual or a small-loss individual.

12. The computing system of claim 11, wherein individuals classified as small-loss individuals are unlikely to experience a disaster, and wherein individuals classified as high-loss individuals are likely to experience a disaster.

13. The computing system of claim 12, wherein filtering the third dataset to determine a subset of the third plurality of individuals that are unlikely to experience a disaster further comprises: determining a subset of the third plurality of individuals that are classified as high-loss individuals and likely to experience a disaster and removing that subset of high-loss individuals from the third plurality of individuals.

14. The computing system of claim 13, wherein the program instructions further cause the computing system to:
generate data useable for rendering a user interface including a plot including:
a Y-axis representing an average of the predicted profitabilities of the subset of the third plurality of individuals that are small-loss individuals and unlikely to experience a disaster, and
an X-axis representing a percentage of individuals of the third plurality of individuals that have been classified as high-loss individuals and filtered from the third plurality of individuals.

15. The computing system of claim 1, wherein the first predictive model is further configured to determine a predicted profitability of an individual using demographic data, geographical data, and/or behavioral data associated with the individual.

16. The computing system of claim 1, wherein performing a fuzzy match between the first dataset and the second dataset further comprises normalizing values of the first data items of the first dataset to be within zero and one.

17. The computing system of claim 1, wherein the program instructions further cause the computing system to sort the subset of the third plurality of individuals into a plurality of profitability ranges based the predicted profitabilities of the respective individuals.

18. The computing system of claim 17, wherein the program instructions further cause the computing system to:
generate data useable for rendering a user interface including a map that visually presents, on the map:
a map of a geographical region associated with the third plurality of individuals; and
a plurality of tiles overlaid on the map, wherein each tile is associated with a respective individual of the third plurality of individuals, and wherein each tile is colored based on the profitability range that the predicted profitability of the respective individual is in.

19. The computing system of claim 1, wherein the program instructions further cause the computing system to:
generate data useable for rendering a user interface including a map that visually presents, on the map, a predicted profitability of at least one individual of the subset of the third plurality of individuals based on a corresponding address or location of the at least one individual.

20. The computing system of claim 1, wherein the first subset of data items in the training dataset and the second subset of data items in the training dataset are non-overlapping.

* * * * *